C. M. CONRADSON.
CIRCULAR MILLING MACHINE.
APPLICATION FILED MAR. 6, 1917.
1,314,635.
Patented Sept. 2, 1919.
6 SHEETS—SHEET 6.
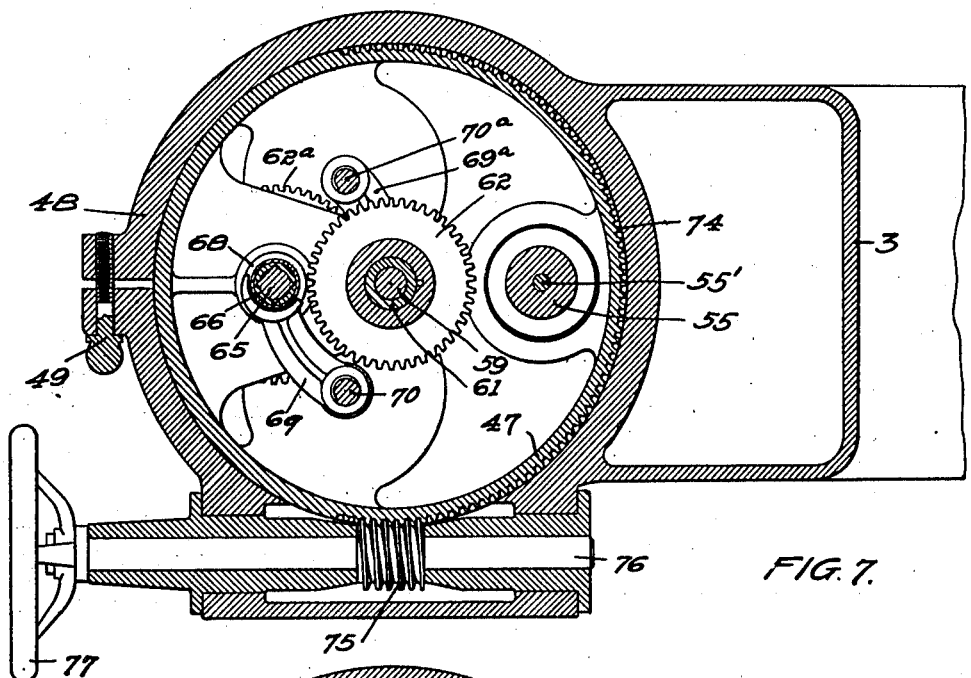
FIG. 7.
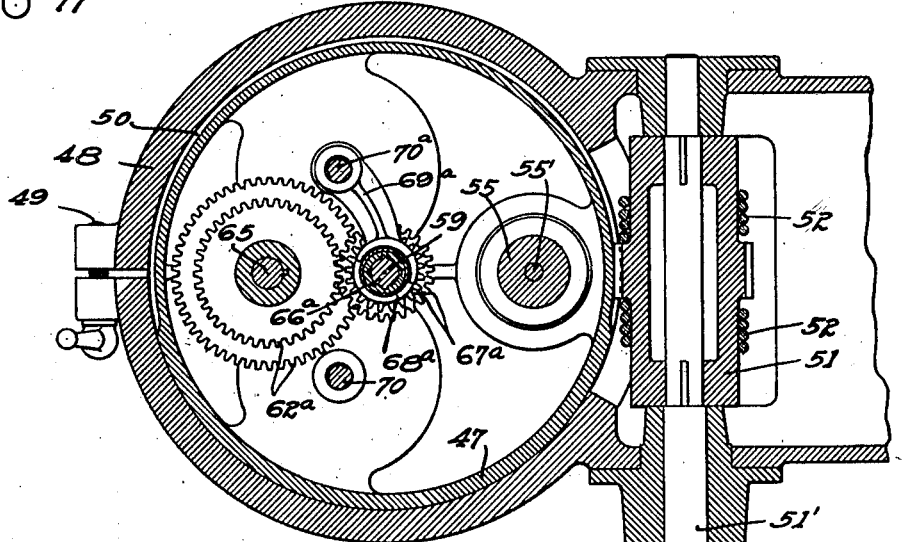
FIG. 8.
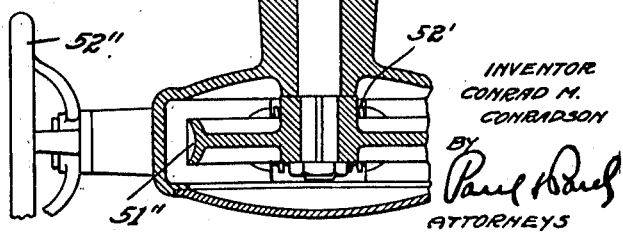

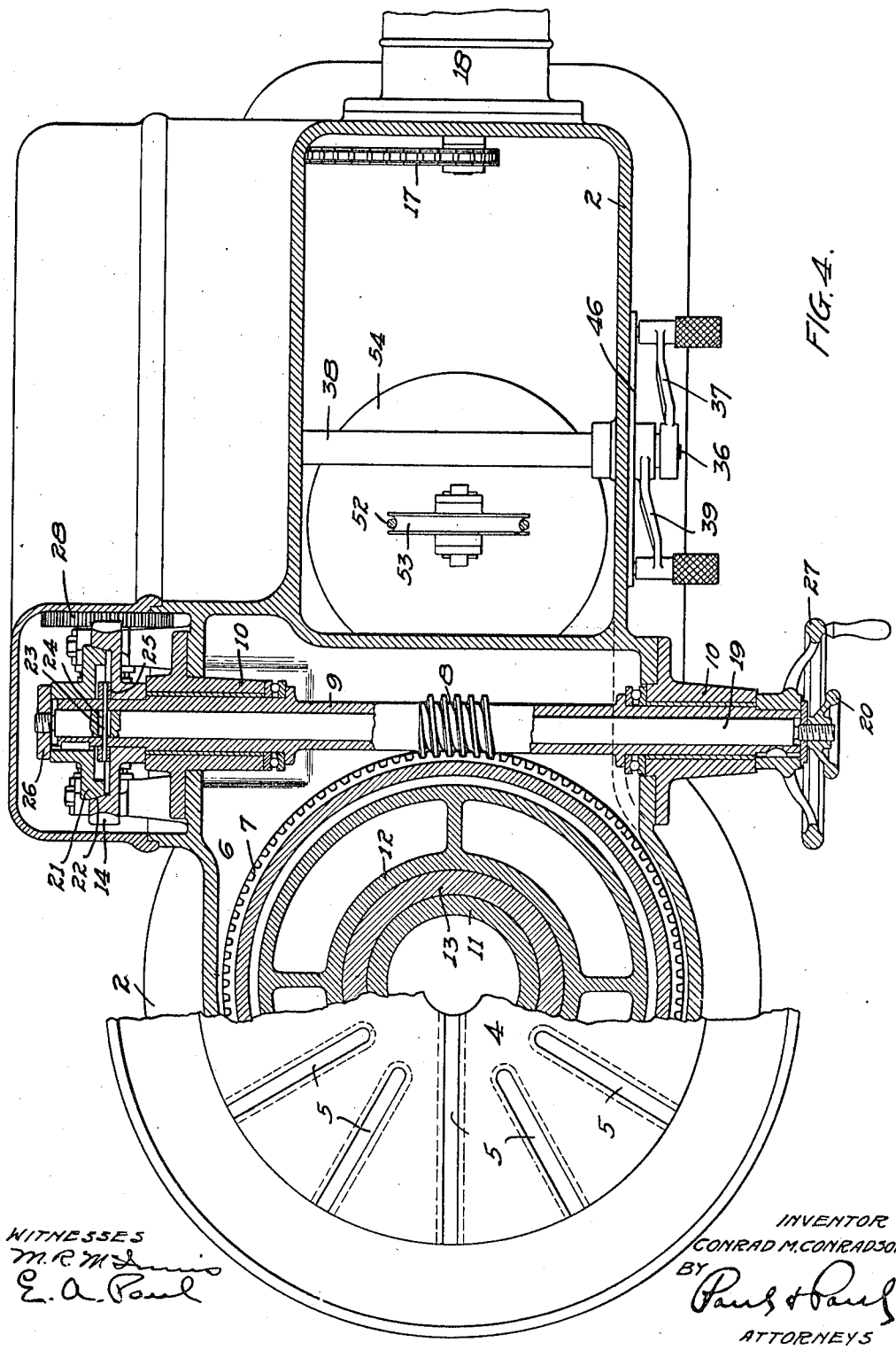

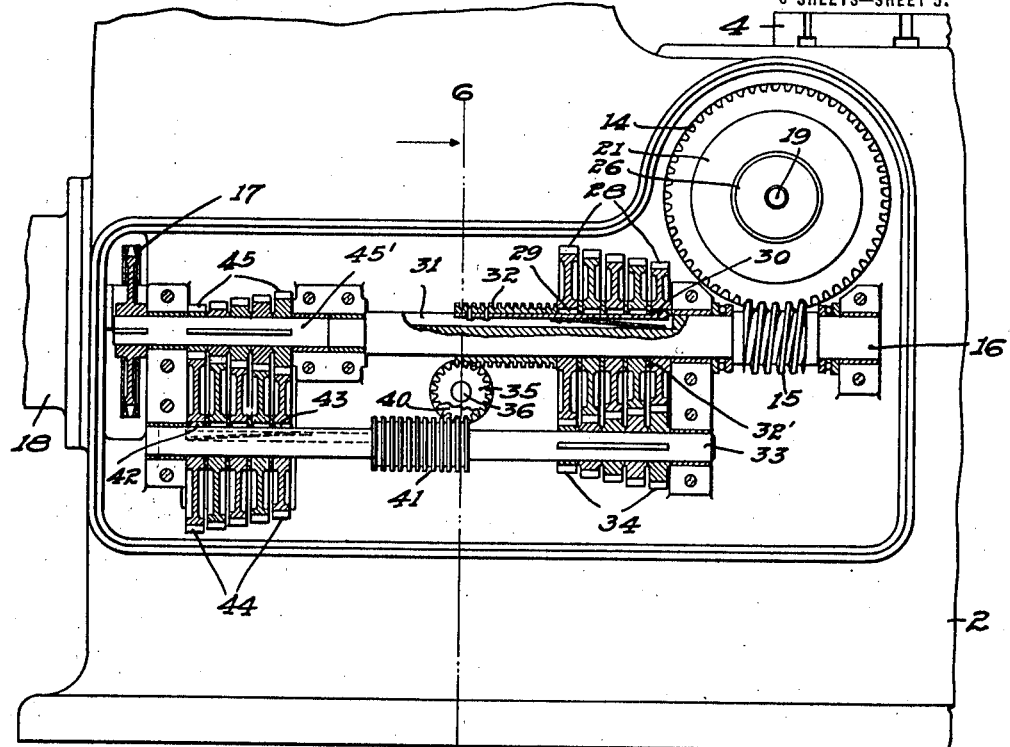

UNITED STATES PATENT OFFICE.

CONRAD M. CONRADSON, OF MADISON, WISCONSIN.

CIRCULAR MILLING-MACHINE.

1,314,635.  Specification of Letters Patent.  Patented Sept. 2, 1919.

Application filed March 6, 1917. Serial No. 152,786.

*To all whom it may concern:*

Be it known that I, CONRAD M. CONRADSON, a citizen of the United States, resident of Madison, county of Dane, State of Wisconsin, have invented certain new and useful Improvements in Circular Milling-Machines, of which the following is a specification.

The object of my invention is to provide a machine for rapidly and economically facing the surfaces of castings or forgings clamped to a revolving work table.

A further object is to provide a machine of this type in which all lost motion of the spindle carrier is eliminated when the machine is at work.

A further object is to provide a milling machine having a wide range of spindle space and ample table capacity to meet any possible conditions of service.

Other objects of the invention will appear from the following detailed description.

The invention consists generally in various constructions and combinations, all as hereinafter described and particularly pointed out in the claims.

In the accompanying drawings forming part of this specification,

Figure 1:
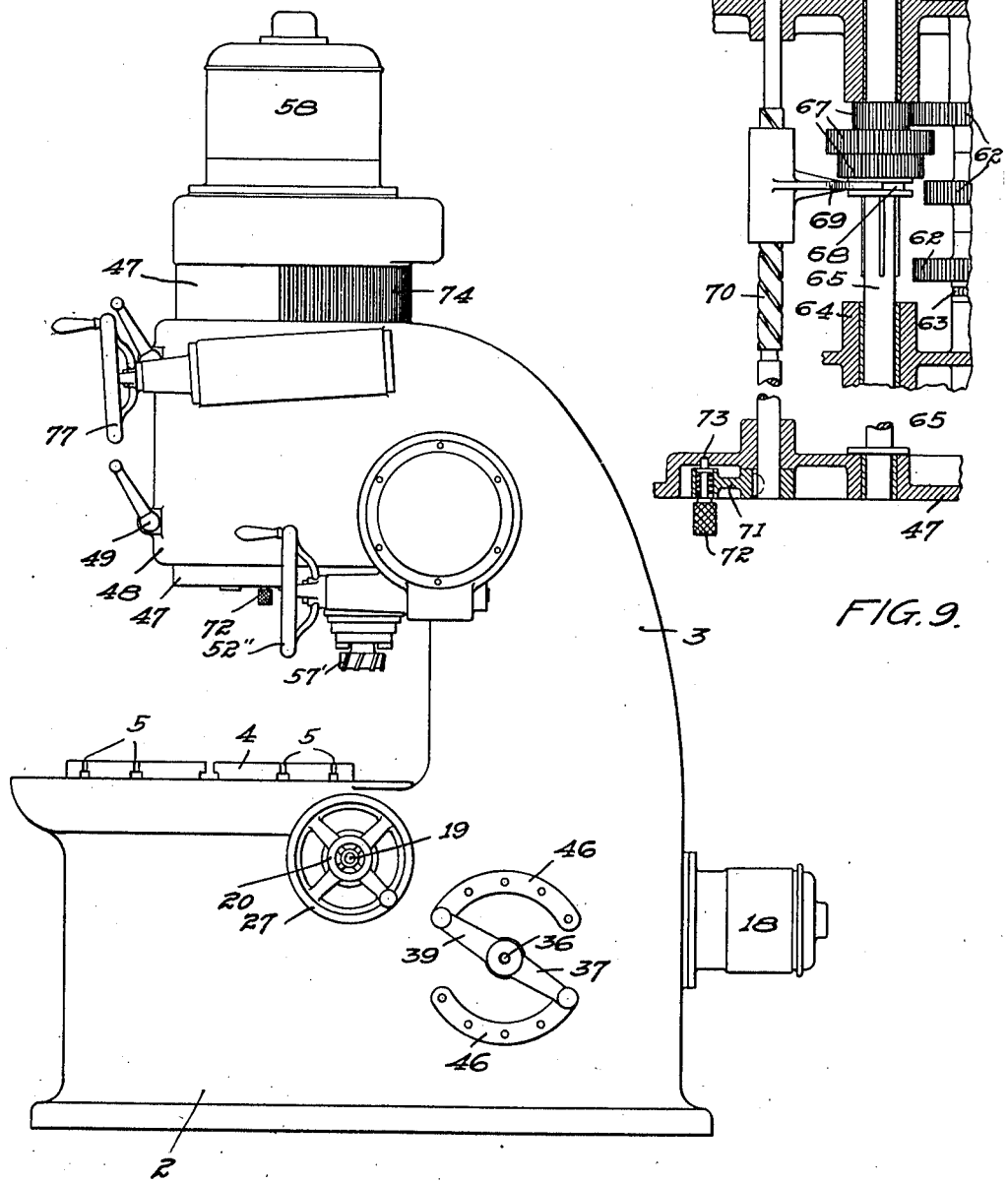
Figure 1 is a side elevation of a milling machine embodying my invention.
Figure 2:
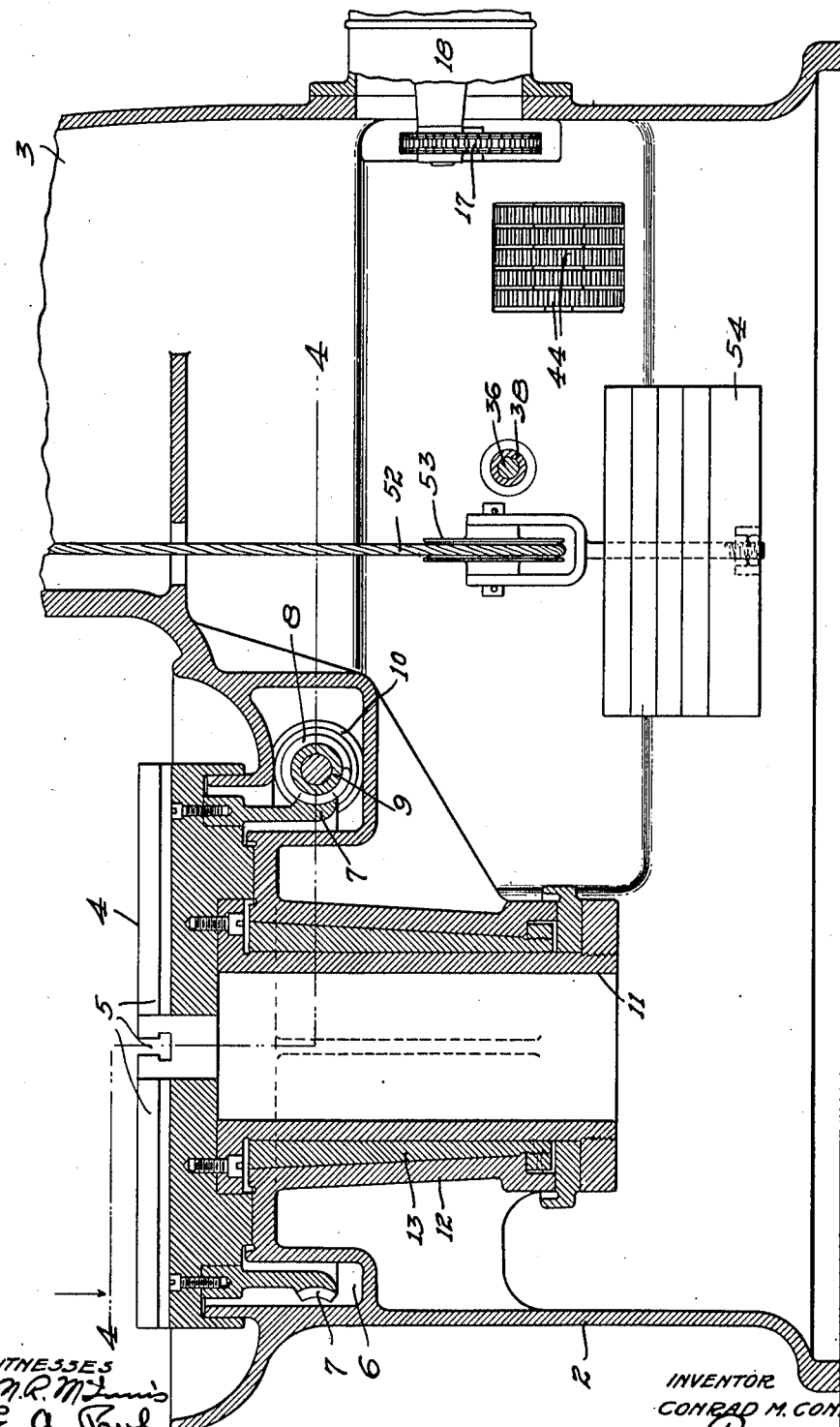
Fig. 2 is a vertical sectional view through the base of the machine.
Figure 3:
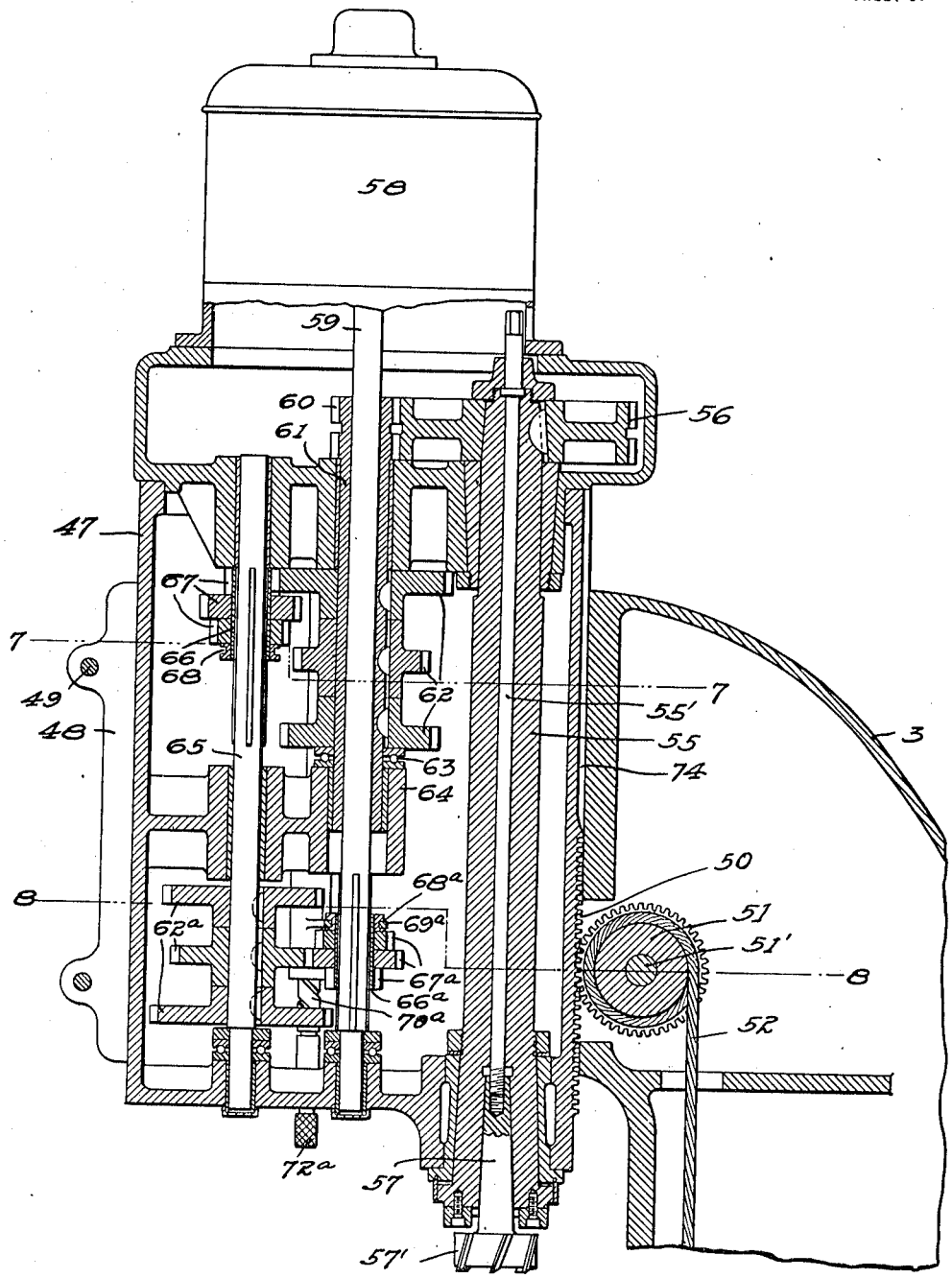

Fig. 3 is a vertical sectional view through the upper portion of the machine and the spindle carrier, Fig. 4 is a horizontal sectional view on the line 4—4 of Fig. 2, Fig. 5 is a vertical sectional view on the line 5—5 of Fig. 6, Fig. 6 is a sectional view on the line 6—6 of Fig. 5, Fig. 7 is a horizontal sectional view on the line 7—7 of Fig. 3, Fig. 8 is a similar view on the line 8—8 of Fig. 3, Fig. 9 is a detail sectional view of the mechanism for shifting the speed-changing gears of the tool carrier supporting spindle.

In the drawing, 2 represents the base of the machine, having a standard or bracket 3 thereon. In this base the work table and the operating mechanism therefor are mounted, while the standard supports the tool carrier and the mechanism for adjusting it and varying the speed of the tool supporting spindle.

Referring to Fig. 2, 4 represents the work table having radial slots 5 therein to receive work supporting chucks, as usual in machines of this type. The machine base has an annular chamber 6 formed therein adapted to contain a supply of oil and a gear ring 7 is secured to the underside of said table and depends within said chamber and has its teeth meshing with a worm 8 formed on a hollow shaft 9 which has bearings 10 in the walls of the base and extends horizontally therethrough.

The base 2 has a centrally arranged depending portion 12 and is provided with a split adjusting sleeve 13 tapered in form and inserted between the sleeve 11 of the work-table 4 and its bearing in the depending portion 12 for taking up wear and lost motion in the operation of the work-table. At one end of the sleeve 9 (Fig. 2) is a loosely mounted worm wheel 14 meshing with a worm 15 on the shaft 16 (see Figs. 4 and 5). The shaft 16 is driven through a belt 17 from the motor 18 mounted at one end on the base (see Figs. 4 and 5). Within the sleeve 9 is a shaft 19 having an operating wheel 20 at one end and a cone-clutch 21 at the opposite end, which is mounted to engage an internal tapered surface 22 of the worm wheel 14 when the wheel 20 is operated to move the shaft 19 lengthwise and engage the clutch member 21 with said tapered surface or the shaft may be moved in the opposite direction to disengage the clutch member. The shaft 19 is provided with a slot 23 and a pin 24 is mounted in a collar 25 on the sleeve 9 and passes through said slot and on which pin the shaft 19 has freedom of longitudinal movement independently of the sleeve 9. The end of the shaft 19 has a nut 26 thereon to bear on the hub of the clutch member for forcing it against the clutching surface of the worm wheel 14.

A hand wheel 27 is secured on the sleeve 9 and whenever desired, the operator, by the adjustment of the shaft 19, may render the gear wheel 14 idle and temporarily disconnect the sleeve 9 from its driving shaft 16 and feed the work table by hand. This hand mechanism is made use of when it is desired to reset the table or move it backward or obtain some adjustment thereof which could not be conveniently effected through the power driven mechanism.

It is desirable in a machine of this type to provide a number of different speeds for the work table, according to the character of the milling that is being performed, and I therefore arrange a series of gears of different sizes on the shaft 16, loosely mounted and designated by reference numeral 28, the gears being all alike as to the number of teeth therein. Each gear has a key-way 29 therein and a spring-pressed key is slidable in a key seat in the shaft 16. Spacing washers 32' are interposed between the gears 28 and the key has a beveled surface for allowing it to engage and slide by these washers during its longitudinal movement from one gear to the other. In making this adjustment of the key, if the ways in the gears should be out of alinement then the key will position itself between the washers of a gear and spring outwardly into the way therein as soon as it reaches a point in the revolution of the gear opposite the key. In this way any one of the gears may be locked on the shaft, as may be desired. The key has a toothed sleeve 32 thereon slidable on the shaft.

A shaft 33 is mounted parallel with the shaft 16 and adjacent thereto and has a series of pinions 34 secured thereon corresponding in number to the gears 28 and meshing respectively therewith. For operating the key 30 I provide a gear 35 mounted on a shaft 36 (see Figs. 5 and 6) which projects through the wall of the base and has an operating handle 37. By operating this handle, the shaft 36 may be revolved and the key 30 moved back and forth in the key seat 31 to lock any one of the gears 32 thereon.

Surrounding the shaft 36 is a sleeve 38 having an operating handle 39 and provided with a gear 40 for meshing with a toothed sleeve 41 on a key 42 which is slidable in a key-seat in the shaft 33 and in key-ways 43 of gears 44 which are loosely mounted on the shaft 33 and in mesh with a corresponding number of gears 45 keyed on the shaft 45'. By this mechanism power is transmitted through the belt 17 from the motor to the shaft 16 through one of the gears 45 on the shaft 45' and a gear 44 to the shaft 33 and from thence through one of the gears 34 to a gear 28 back to the shaft 16 and the worm 15 and worm wheel 14 and clutch member 21 to the sleeve 9 and the work-table. There are evidently, from an examination of Fig. 5, five different adjustments of the independent keys 30 and 42 and as the speed of the work-table is varied by the shifting of one of these locking keys independently of the other one, it is evident that twenty-five different speeds for the work table are provided for, all that ever would be necessary with any kind of work which may be placed in the milling machine.

The shifting mechanism is within convenient reach of the operator of the machine, and he can easily and quickly vary the speed whenever desired by the simple adjustment of one of the levers 37 or 39. For holding these levers in place, I prefer to provide plates 46 on the outer wall of the base, with depressions therein to receive the ends of the levers and hold them against accidental movement. It will be noted that these levers are adjacent the wheels 20 and 27 which control the operation of the table by hand or power.

Having now described the base of the machine and the work-table, I will explain in detail the construction of the upper portion of the machine and the tool-carrying and operating mechanism.

Referring to Fig. 3, 47 represents a cylindrical shaped member or barrel, mounted in a clamp 48 in the upper part of the bracket 3 and rigidly secured between the jaws of the clamp by bolts 49. The barrel has rack teeth 50 thereon meshing with the teeth of a drum 51 to which a cable 52 is attached, which passes around a sheave 53 to a counter-balance weight 54, the parts being so adjusted that the counter-balance will support the load of the barrel and the mechanism therein and permit the clamping bolts 49 to be loosened and the barrel rotated to shift the position of the cutter spindle therein. The drum 51 has a shaft 51' provided with a worm wheel 51'' which is revolved by a worm 52' on a shaft having an operating wheel 52'' for the purpose of revolving the drum 51 and raising or lowering the barrel when its clamp has been released. The spindle, which I will designate by reference numeral 55, is eccentrically mounted in the barrel, as shown in Fig. 3, and is provided at its upper end with a large gear wheel 56. A motor 58 is mounted on the top of the barrel and its shaft 59 is extended concentric with the barrel 47. A rod 55' is mounted concentric with the spindle 55 and has its lower end tapped into the shank 57 of the tool carrier 57'. The rotation of the rod 55' will have the effect of tightening or loosening the shank 57 to mount the tool in the spindle or disengage it therefrom.

A gear 60 is formed on the sleeve 61 which extends downwardly on the shaft 59 and is provided with gears 62 of varying sizes secured thereon, bearings for said gears being provided at 63 on a bracket 64 within said barrel and in which bracket the sleeve 61 is journaled. The shaft 59 depends to the bottom or lower end of the barrel and is journaled therein and a back gear shaft 65 is journaled in the bracket 64 and in the upper and lower portion of the barrel. A sleeve 66 is splined on the back gear shaft 65 and has gears 67 of different sizes mounted thereon to mesh respectively with the gears 62 and said sleeve has an annular groove 68 to receive an arm 69 mounted on a screw 70 having bearings in the barrel and provided with an operating lever 71 which is normally locked by a spring-pressed pin 72. By withdrawing this pin from its socket 73 in the wall of the barrel, the lever 71 will be released to allow the screw 70 to be revolved and raise or lower the arm 69 and change the position of the gears 67 for the purpose of varying the speed of the cutter spindle. The lower end of the shaft 59 has a set of gears 67$^a$, corresponding to those described, splined on this shaft to mesh with gears 62$^a$ corresponding to those described on the sleeve 61, and secured to the shaft 65, the adjustment of the gears 67$^a$ being effected through a screw and lever device corresponding to the one shown in Fig. 9 and which I will indicate by the same reference numeral with the addition of the exponent "a". By the adjustment of these gears, nine different speeds of the spindle can be obtained, which I have found to be ample in a machine of this type.

For the purpose of rotating the barrel to change the position of the cutter spindle, I provide its periphery with teeth 74 meshing with a worm 75 on a shaft 76 journaled in the walls of the clamp and having an operating wheel 77. When the clamping bolts are released, this shaft may be revolved and the barrel rotated to obtain the desired adjustment of the cutter spindle and the tool carrier with respect to the plane of the work-table beneath.

When this machine is at work, the spindle carrier or barrel is rigidly clamped, thereby eliminating all lost motion. Quick change gears make it possible to rotate the table, as slow as one turn in thirty minutes or up to one turn in one minute, as desired. The barrel is capable of both vertical and rotary adjustment, and has its source of motive power directly mounted thereon, with variable speed driving connections between it and the spindle, and the position of the spindle with respect to the work can be easily and quickly changed when desired.

In various ways the details of construction herein shown and described may be modified within the scope of the appended claims.

I claim as my invention:

1. The combination, with a supporting standard, of a barrel mounted for rotary movement therein on a vertical axis, a driving shaft journaled in said barrel, a spindle eccentrically mounted in said barrel and geared to said driving shaft, and a revolving work table mounted beneath said barrel.

2. The combination, with a supporting standard, of a barrel mounted for rotation on a vertical axis, a motor carried by said barrel, and having its shaft concentric therewith, a spindle eccentrically mounted in said barrel, and variable speed driving connections between said shaft and said spindle.

3. The combination, with a support, of a barrel having peripheral teeth and mounted to rotate on a vertical axis, a worm mounted for engagement with said teeth to rotate said barrel, a spindle eccentrically mounted in said barrel and having a driving connection with said source of motive power and a work table mounted for rotation beneath said barrel.

4. The combination, with a support having a clamp formed therein, of a barrel fitting within said clamp, and secured thereby against vertical movement, a counter-balance for said barrel for supporting it when said clamp is released, a source of motive power mounted on said barrel, and a spindle mounted in said barrel and having a variable speed driving connection with said source of motive power.

5. The combination, with a support, of a barrel mounted for rotary and vertical movement therein, a clamp for locking said barrel, when adjusted, a spindle journaled in said barrel and a source of motive power carried by said barrel and having driving connection with said spindle.

6. The combination, with a support, of a barrel having a longitudinal and rotary adjustment independently of each other therein, a spindle eccentrically carried by said barrel, driving connections for said spindle and a table mounted for rotation beneath said barrel, the eccentric mounting of said spindle permitting radial adjustment with respect to said table.

7. The combination, with a standard, of a barrel mounted for rotary movement therein, a motor mounted on the upper end of said barrel and having its shaft depending within said barrel and journaled therein, a spindle eccentrically mounted in said barrel, a gear wheel mounted on the upper end of said spindle, a pinion mounted on said motor shaft and meshing with said gear wheel and a variable speed gearing for driving said pinion from said shaft.

8. The combination, with a support, of a barrel mounted for rotation therein, a spindle eccentrically mounted in said barrel, a driving shaft centrally mounted in said barrel, a back gear shaft and variable speed driving connections between said eccentrically mounted spindle and said driving shaft through said back gear shaft.

9. A milling machine comprising a base, a revolving work-table mounted therein, a barrel supported for rotation above said work-table, a counter-balance therefor, a spindle eccentrically mounted in said barrel, a motor carried by said barrel and having its shaft concentric therewith, and variable speed driving connections between said spindle and said shaft.

10. The combination, with a frame, of a work-carrying table mounted therein, a barrel, a spindle eccentrically mounted therein, means for rotating said barrel to adjust said spindle radially with respect to said work-carrying table, and means for varying the distance between said spindle and said work-carrying table.

11. The combination, with a frame, of a work-carrying table mounted therein, means for rotating it and varying its rate of rotation, a barrel mounted for rotation and for longitudinal movement toward and from said work-table, and a tool-carrying spindle eccentrically mounted in said barrel and adjusted radially with respect to said table by the rotation of said barrel.

12. A circular milling machine comprising a base, a work table mounted therein, a standard overhanging said work table, a barrel mounted in said standard above said work table and having means for rotary adjustment therein, a motor carried by said barrel and having its shaft depending within said barrel, and concentric therewith, and a tool carrying spindle eccentrically mounted in said barrel and geared to said motor shaft.

13. The combination, with a frame, of a work-carrying table mounted therein, a barrel, a spindle eccentrically mounted therein, means for rotating said barrel to adjust said spindle radially with respect to said work-carrying table and means for raising and lowering said barrel.

14. The combination, with a base and a work table mounted for rotation therein, of a standard having an upper portion overhanging said base, a barrel vertically mounted in the overhanging portion of said standard and having means for vertical and rotary adjustment in its bearings, a motor supported on said barrel and having its shaft depending centrally and journaled therein, a tool spindle eccentrically mounted in said barrel and geared to said motor shaft, the rotary adjustment of said barrel on a vertical axis shifting said spindle with respect to said work table.

15. A machine of the class described comprising a base, a work table mounted for rotary movement therein, a standard surmounting said base and overhanging said work table, a member mounted for rotary and vertical adjustment in said standard, a motor carried by said member and having its shaft depending and journaled therein, a tool spindle eccentrically mounted in said bearing, a sleeve loosely mounted on said motor shaft and geared to said spindle, and a back gear shaft having variable speed driving connections with said motor shaft and with said sleeve.

16. The combination, with a support and a barrel mounted therein, a motor carried by said barrel and having its shaft depending and journaled therein, a sleeve loosely mounted on said shaft, a tool carrying spindle geared to said sleeve, a back gear shaft journaled in said bearing and having variable speed driving connections with said motor shaft and with said sleeve.

17. The combination, with a support, of a member mounted for rotation therein, a driving shaft concentrically mounted in said member, a sleeve loosely mounted on said driving shaft and journaled in said member, a tool carrying spindle eccentrically mounted in said member and geared to said sleeve, a back gear shaft journaled in said member and having variable speed driving connections with said driving shaft and with said sleeve.

In witness whereof, I have hereunto set my hand this 27th day of February, 1917.

CONRAD M. CONRADSON.